Dec. 27, 1932.  C. G. EISENBERG, JR  1,891,922
DUMPING MECHANISM
Filed Dec. 17, 1930  3 Sheets-Sheet 3

INVENTOR.
Charles G. Eisenberg Jr.,
BY
Morsell & Morsell
ATTORNEYS

Patented Dec. 27, 1932

1,891,922

UNITED STATES PATENT OFFICE

CHARLES G. EISENBERG, JR., OF WAUWATOSA, WISCONSIN, ASSIGNOR TO THE HEIL CO., OF MILWAUKEE, WISCONSIN, A CORPORATION OF WISCONSIN

DUMPING MECHANISM

Application filed December 17, 1930. Serial No. 502,961.

The present invention relates in general to improvements in the art of handling materials in bulk, and relates more specifically to improvements in the construction and operation of mechanisms for tilting the bodies of vehicles such as trucks, in order to dump material therefrom.

An object of the invention is to provide improved dumping mechanism which is simple and durable in construction, and which is moreover highly efficient and flexible in operation.

In the art of hauling materials in bulk, it is desirable to meet various delivery conditions. Different materials have different angles of repose, thereby making it necessary when dumping the material from a truck body, to tilt the body to different dumping angles when handling different substances in bulk. It is moreover frequently desirable to vary the height of the point of delivery of the material from the body, thereby making it necessary to elevate the body more or less before discharging the material therefrom. In some cases, it is also desirable to dump the material at different distances away from the rear end of the truck, and the dumping mechanism should be capable of thus delivering the substance. Due to the fact that the bulk material frequently contains a high percentage of moisture, thus causing the substance to pack and to stick against the sides and bottom of the truck body, it is also desirable during dumping to subject the carrier body to quick lifting and sudden stoppage at the end of the dumping stroke, in order to loosen the sticky mass and to thereby enhance the dumping action.

It is a more specific object of the present invention to provide improved dumping mechanism which will thoroughly meet all of the above-mentioned special conditions.

Another specific object of the invention is to provide simple and efficient mechanism for dumping various kinds of bulk substances from a truck body or the like.

A further specific object of the invention is to provide mechanism for effecting delivery of material from a truck body or the like at any desired elevation and at any point with reference to the rear portion of the truck body.

Still another specific object of the invention is to provide improved means for insuring effective delivery of sticky material from a tiltable truck body or the like.

Another specific object of the invention is to provide dumping mechanism which insures maximum stability of the supporting truck during the dumping operation.

These and other objects and advantages will appear from the following detailed description.

A clear conception of several embodiments of the invention and of the mode of constructing and of manipulating dumping mechanisms built in accordance therewith, may be had by referring to the drawings accompanying and forming a part of this specification in which like reference characters designate the same or similar parts in the various views.

Figure 1:
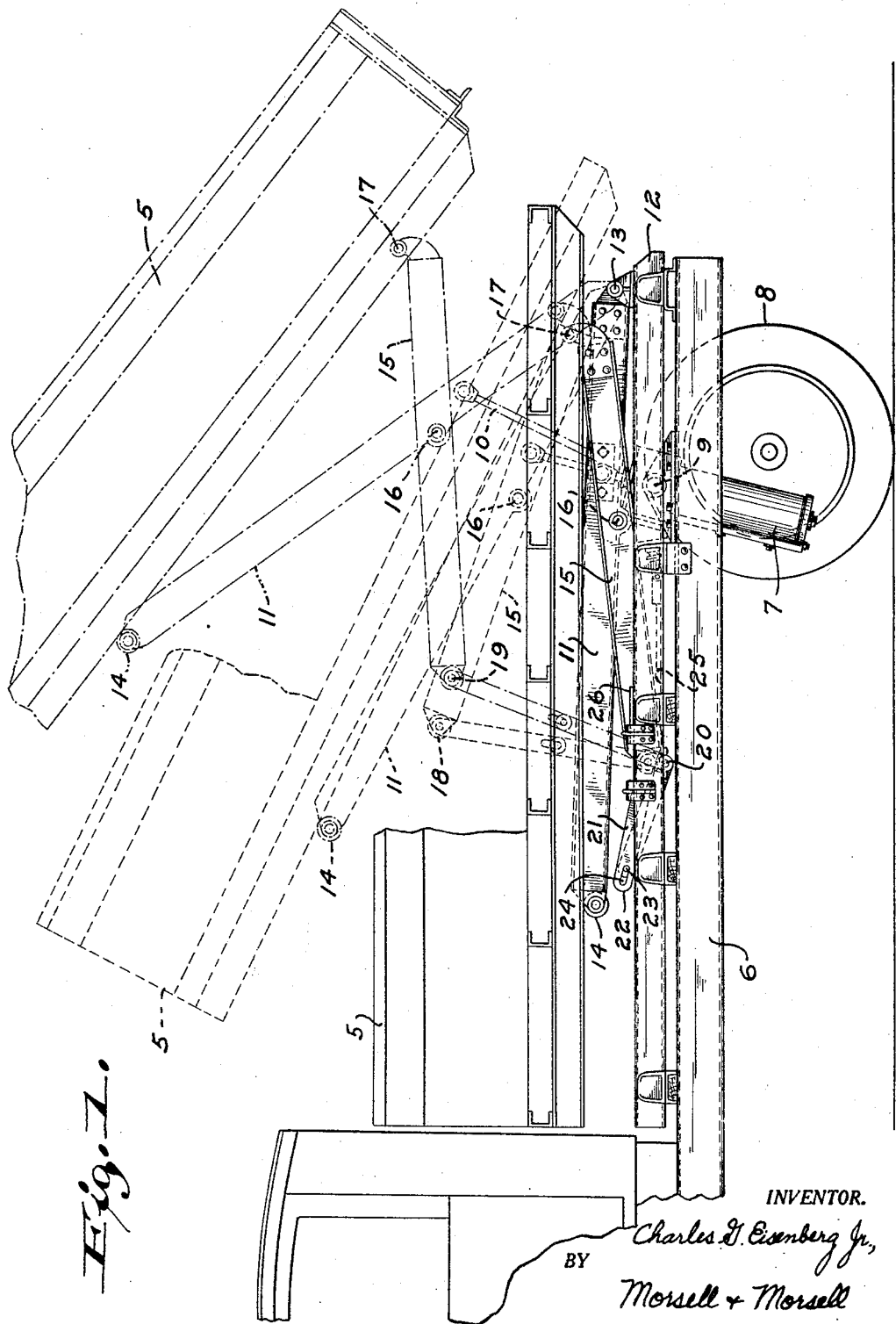
Fig. 1 is a fragmentary side view of a truck and body, showing one form of body tilting mechanism associated therewith, and also showing the body in various positions of adjustment.
Figure 3:
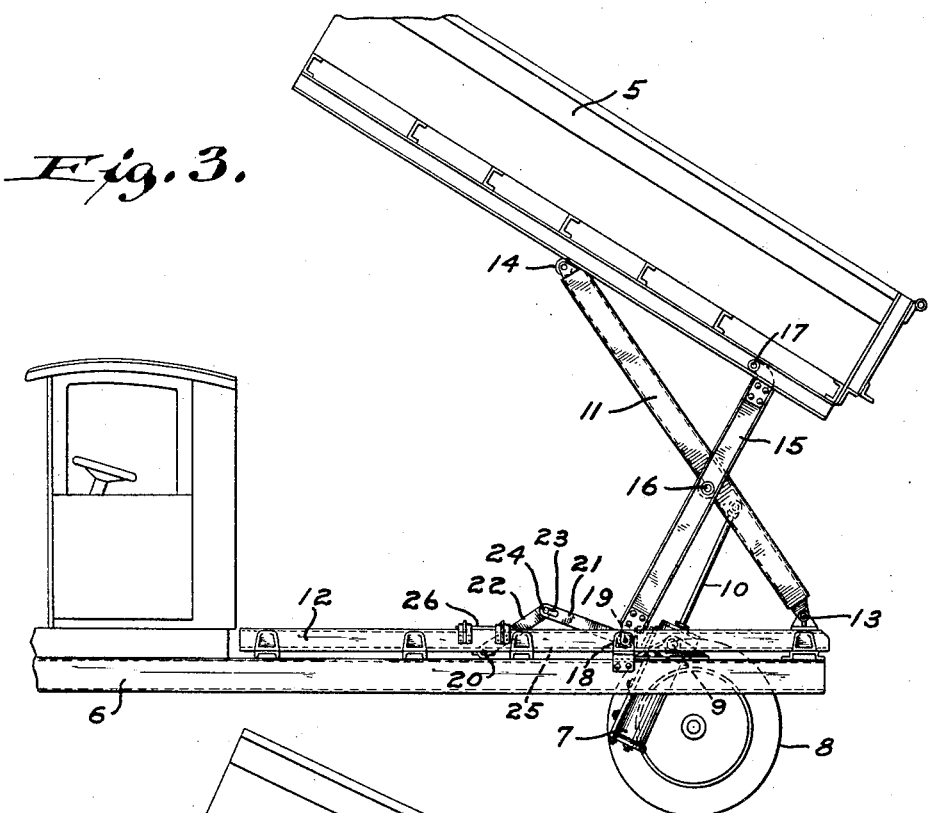
Fig. 3 is a fragmentary side view of the truck, body and tilting mechanism of Fig. 1, showing the latter in its extreme elevated and tilted position.

Referring specifically to Figs. 1 and 3, the body 5 is tiltably associated with the chassis 6 of a tractor or the like, and is capable of being elevated and rearwardly tilted, by means of one or more fluid pressure actuated hoists 7, pivotally supported upon the chassis 6 near the rear wheels 8, by means of horizontal trunnions 9. The hoist 7 is of the duplex type comprising a pair of laterally adjacent parallel cylinders, and the piston rods 10 of the hoists 7, are pivotally connected at their upper ends with the medial portion of a pair of laterally spaced beams 11, the rear extremities of which are pivotally connected to a supporting frame 12 fixedly mounted upon the chassis 6 by means of alined pivot pins 13. The opposite forward extremities of the beams 11 are movably associated with the forward lower portion of the truck body 5 by means of alined rollers 14, and the mid portion of each of the beams 11 is pivotally associated with the medial portion of a cross beam 15 by means of a pivot pin 16. The rear extremity of each cross beam 15 is fixedly pivoted to the rear lower portion of the body 5 by means of a pivot pin 17, and the forward extremity of each of the cross beams 15 carries a roller 18 and a pivot pin 19 with which the roller is rotatably associated. The pivot pins 19 are inter-connected with a pair of fixed pivots 20 mounted upon the side frames 12, by means of sets of toggles each comprising an upper slotted link 21, and a lower link 22 which carries a pin 23 coacting with an end slot 24 formed in the adjacent portion of the upper link 21. The rollers 18 carried by the front ends of the cross-beams 15, are cooperable with horizontal run-ways 25 on the adjacent sides of the channel bars constituting the side frames 12, and removable plates 26 slidably attached to the side frames 12 are movable with respect to openings in the run-ways 25 to either guide the rollers 18 along the run-ways, or to permit the rollers to move laterally away from the side frames 12.

During normal operation of the improved dumping mechanism just described, the plates 26 are removed from above the openings in the run-ways 25 whenever it is desired to deliver a load of material at a considerable distance beyond the rear end of the truck chassis 6 and relatively close to the ground as indicated in Fig. 1, and may be interchangeably moved over the run-way openings to guide the rollers 18 horizontally along the run-ways 25 when extremely high lifting and delivery of the material is desired, as indicated in Fig. 3. It will be understood that the dump body 5 is in each case provided with the usual type of rear gate, operable either manually or automatically to deliver the bulk material from the rear of the body when the latter is tilted.

When the plates 26 have been removed from above the run-way openings as shown in Fig. 1, thereby permitting upward movement of the rollers 18 away from the side frames 12, and power is applied to the hoists 7, the piston rods 10 will move upwardly and will initially elevate the beams 11, 15 and the body 5, to the dash-line position of Fig. 1. During the initial displacement of the parts, the beams 11, 15 maintain their positions relative to the body 5, and these elements merely swing as a unit about the fixed pivot pins 13 carried by the side frames 12, thus causing the toggle links 21, 22 to unfold and to assume alined substantially vertical positions. As the upward movement of the piston rods 10 continues, the beams 11, 15 swing relative to each other about the medial connecting pins 16 and the rollers 14 at the front ends of the main beams 11 move or slide along the bottom of the body 5 while the rear ends of the beams 15 merely swing relative to the body about the pivot pins 17. During this relative swinging of the beams 11, 15 the toggle links 21, 22 maintain their relative positions of alinement and merely swing rearwardly slight distances, the various parts eventually assuming the positions indicated in dot and dash lines in Fig. 1. With the body 5 thus elevated, inclined and disposed, it will be apparent that the rear delivery gate of the body is located quite a distance rearwardly of the chassis end and relatively close to the ground level.

When the plates 26 are positioned over the run-way top openings as shown in Fig. 3, thereby compelling the rollers 18 to remain within the run-ways 25, and power is applied to the hoists 7, the piston rods 10 move upwardly to the extreme ends of their strokes and quickly elevate the body 5 to its extreme uppermost position and simultaneously tilt the same. During this operation, the rollers 18 move horizontally along the run-ways 25 and the beams 11 swing about their fixed pivot pins 13, thereby causing the beams 11, 15 to swing relatively to each other about the pivot pins 16 which interconnect the medial portions of these beams. The toggle links 21, 22 by virtue of the lost motion connections afforded by the pins 23 and slots 24, permit unrestrained movement of the rollers 18 along the run-ways 25, as indicated in Fig. 3. The rear ends of the beams 15 swing relative to the body 5 about the fixed pivot pins 17, whereas the rollers 14 carried by the front ends of the beams 11, again move or slide along the bottom of the body 5 and tilt the body about the pins 17. By virtue of the fact that the beams 11, 15 are swung upwardly to a considerable angle relative to the horizontal, the body 5 is lifted to a considerable height, and the difference in length of the beams 11, 15 insures tilting of the body 5 to the desired extent.

Figure 2:
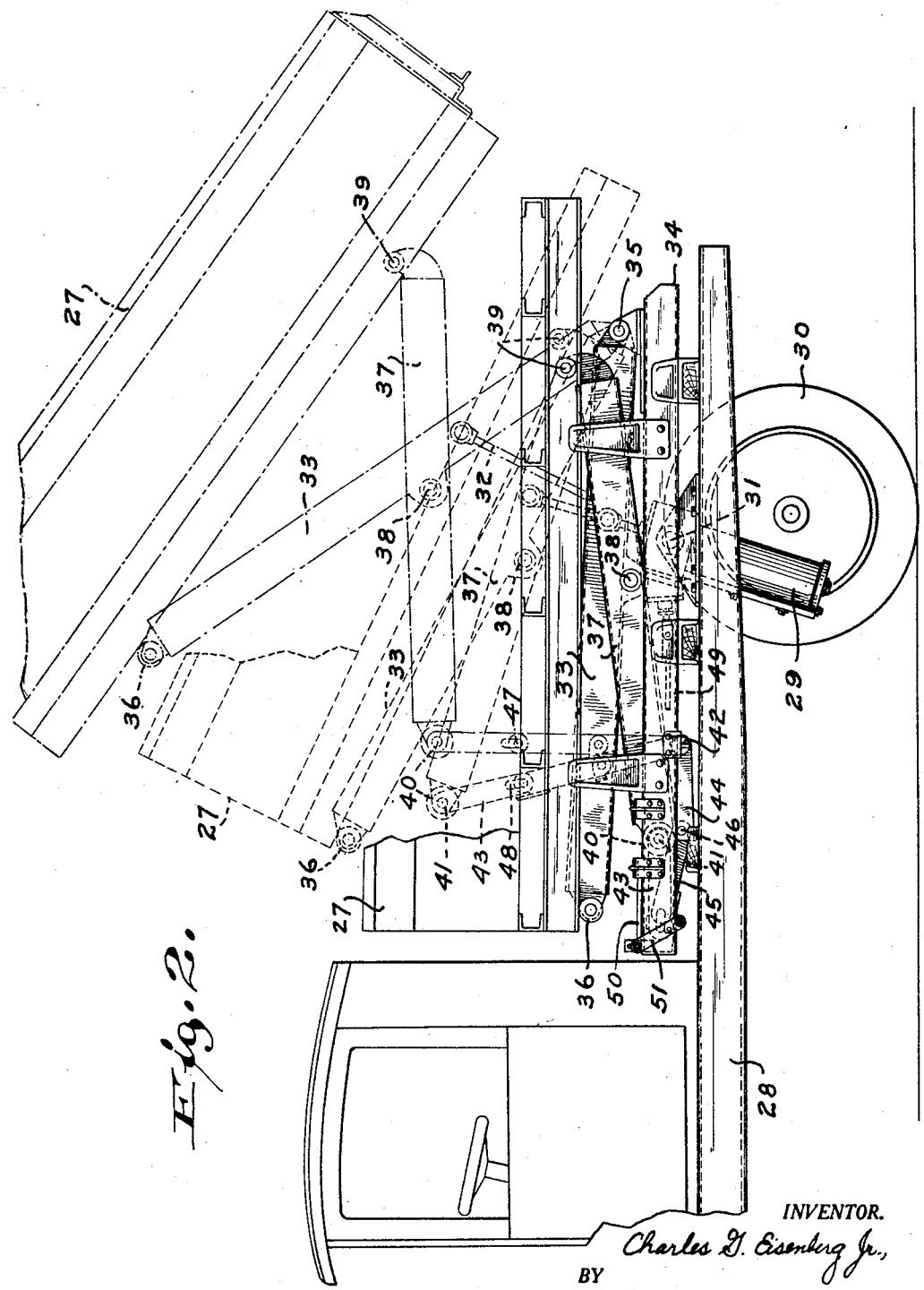
Fig. 2 is a similar fragmentary side view of a truck and body, showing another form of body tilting mechanism applied thereto, and likewise showing the body in various positions of adjustment.
Figure 4:
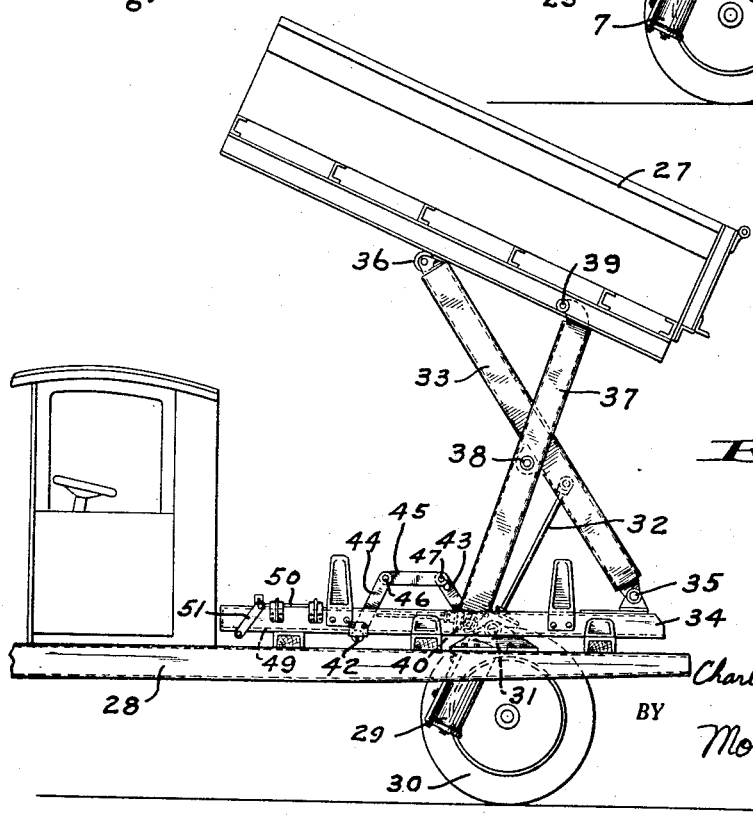
Fig. 4 is a similar fragmentary side view of the truck, body and tilting mechanism of Fig. 2, showing the body in extreme elevated and tilted position.

Referring specifically to Figs. 2 and 4, the body 27 is again tiltably associated with a chassis 28 of a tractor or the like, and is capable of being elevated and tilted rearwardly, by means of one or more fluid pressure actuated hoists 29 pivotally supported upon the chassis 28 near the rear wheels 30, by means of horizontal trunnions 31. The hoists 29 are again of the duplex type comprising a pair of laterally adjacent parallel cylinders, and the piston rods 32 of the hoists 29 are pivotally connected at their upper extremities with the medial portions of a pair of laterally spaced beams 33, the rear extremities of which are pivotally connected to the supporting or side frames 34 which are fixedly mounted upon the chassis 28, by means of alined pivot pins 35. The opposite or forward extremities of the beams 33 are movably or slidably associated with the forward lower portion of the truck body 27 by means of alined rollers 36, and the mid portions of the beams 33 are pivotally associated with the medial portions of cross beams 37 by means of pivot pins 38. The rear extremity of each of the cross beams 37 is fixedly pivoted to the rear lower portion of the body 27 by means of a pivot pin 39, and the forward extremity of each of the cross beams 37 is provided with a roller 40 rotatably supported upon a pivot pin 41. The pivot pins 41 are interconnected with a pair of fixed pivots 42 mounted upon the side frames 34, by means of two sets of toggles each comprising an upper slotted link 43, a lower link 44 and an intermediate toggle link 45. The toggle links 45 are pivotally connected at their lower ends directly to the lower links 44 by means of pins 46, and carry other pins 47 at their upper extremities which coact with slots 48 formed in the lower ends of the links 43. The rollers 40 at the front ends of the cross beams 37, are cooperable with horizontal runways 49 on the adjacent sides of the channel bars constituting the side frames 34, and removable plates 50 which are slidably attached to the side frames 34, are movable with respect to openings in the runways 49 to either guide the rollers 40 along the runways, or to permit the rollers to move laterally away from the adjacent side frames 34. The plates 50 may be simultaneously adjustable by means of levers 51 pivotally associated with the side frames 34 and coacting with slotted heads on the plates.

During normal operation of the improved dumping mechanism shown in Figs. 2 and 4, the plates 50 may be removed from above the openings in the runways 49 when it is desired to deliver a load of material at some distance beyond the rear end of the chassis 28 and relatively close to the ground as indicated in Fig. 1, and may be interchangeably disposed over the runway openings so as to guide the rollers 40 horizontally along the runways 49 when relatively high lifting and delivery of the material is desired, as indicated in Fig. 4. It should again be understood that the dump body 27 of the modified disclosure, is in each case provided with the usual type of rear gate, operable either manually or automatically to deliver the material from the rear end of the body 27 when the latter is in tilted position.

When the plate 50 has been slid forwardly from above the runway openings as shown in Fig. 2, thereby permitting free upward movement of the rollers 40 away from the side frames 34, and power is applied to the hoists 29, the piston rods 32 will move upwardly and will initially elevate the beams 33, 37 and the body 27, to the dash-line position of Fig. 2. During such initial displacement of the parts, the beams 33, 37 maintain their positions relative to the body 27, and these elements merely swing as a unit about the fixed pivot pins 35 at the rear end of the side frames 34, thus causing the toggle links 43, 44, 45 to unfold and to assume a position somewhat inclined with respect to the vertical. As the upward movement of the piston rods 32 continues, the beams 33, 37 are displaced relative to each other, about the medial connecting pins 38, and the rollers 36 at the forward ends of the main beams 33 ride along the bottom of the body 27, while the rear ends of the beams 37 merely swing relative to the body about the pivot pins 39. During this relative swinging of the beams 33, 37, the alined toggle links 43, 44, 45 swing as a unit toward the vertical, and the various parts eventually assume the positions indicated in dot and dash lines in Fig. 1. With the body 27 thus elevated, inclined and disposed, it will be apparent that the rear delivery gate of the body is located some distance in back of the end of the chassis 28, and is also disposed relatively close to the ground level.

When the plates 50 have been positioned over the runway top openings by sliding the same forwardly to the position shown in Fig. 4, thereby compelling the rollers 40 to remain within the runways 49, and power is applied to the hoists 29, the piston rods 32 move upwardly to the extreme ends of their strokes and thus quickly elevate the body 27 to its uppermost position, simultaneously tilting the body. During this operation, the rollers 40 advance horizontally along the runways 49 and the beams 33 swing about their fixed pivot pins 35, thereby causing the sets of beams 33, 37 to swing relatively to each other about the medial pivot pins 38 interconnecting the mid portions of these beams. The toggle links 43, 44, 45, by virtue of the lost-motion connections afforded by the pins 47 and slots 48, permit unrestrained movement of the rollers 40 along the runways 49, as will be clearly apparent from Fig. 4. The rear ends of the beams 37 swing relatively to the body 27 about the pivot pins 39, whereas the rollers 36 again move or advance along the bottom of the body 27 and tilt the body about the pins 39. Due to the fact that the beams 33, 37 are swung upwardly to a relatively steep angle with respect to the horizontal, the body 27 is quickly lifted to a considerable height, and the relatively greater length of the main beam 33 as compared to the beam 37 insures proper tilting of the body 27.

From the foregoing description, it will be apparent that both of the improved dumping mechanisms will permit interchangeable actuation of the dumping bodies either to position the rear delivery end of the body at some distance beyond the end of the tractor, or to elevate the body to a considerable height and simultaneously tilt the same. The mechanism is operable with minimum power by properly disposing the hoisting device with respect to the body supporting beams, and these beams may be formed adjustable in length so as to readily vary the degree of tilting obtainable. The links of the toggles are preferably provided with suitable stops for preventing the same from traveling beyond alined position, and the closure plates for the openings at the upper portions of the runways, may be readily simultaneously actuated by suitably interconnecting the plates at the opposite sides of the truck. The mechanism may moreover be applied as a unit to any standard tractor or truck, being suitably supported upon the chassis and connected thereto in such position that the displacement of the body will not tend to tilt the truck upon its supporting wheels. It will also be apparent that while the dumping mechanism illustrated include two sets of beams and toggles, it may in some cases be desirable to eliminate one of these sets and such simplification can obviously be attained without the exercise of invention.

It should also be apparent that the center of gravity of the load is at all times maintained as far forwardly of the truck, as possible, without interfering with proper dumping, thereby effectively preventing rearward tilting or tipping of the truck, and this is an important feature of the present invention. This action is especially desirable during high lifting, and it will be obvious that the present improved high-lift mechanism automatically maintains the center of gravity considerably further forward than when low-lifting is effected. The roller bearings between the forward ends of the main beams and the dumping body, and between the forward ends of the secondary beams and the runways, also tend to reduce friction losses to a minimum thereby permitting actuation of the pumping mechanisms with minimum expenditure of power. The improved dumping mechanism will moreover effectively dislodge and dump relatively sticky materials without affecting the stability of the truck and regardless of the height of lifting of the body.

It should be understood that it is not desired to limit the invention to the exact details of construction and to the precise mode of operating dumping mechanisms as shown and described herein, for various modifications within the scope of the claims may occur to persons skilled in the art.

It is claimed and desired to secure by Letters Patent:

1. In combination, a frame, a body, a main beam having one end pivotally associated with said frame and having its opposite end swingably associated with said body, a second beam having one end pivotally associated with said body and having its medial portion pivotally attached to a medial portion of said main beam, guide means carried by the opposite end of said second beam and cooperable with a run-way on said frame, a toggle interchangeably cooperable with said run-way for connecting said guide means supporting end of said second beam with said frame, and a hoist for moving said guide means and for relatively moving the links of said toggle.

2. In combination, a frame, a body, a main beam having its rear end pivotally attached to the rear portion of said frame and having its front end swingably associated with said body, a second beam having its rear end pivotally attached to said body and having its medial portion pivotally attached to a medial portion of said main beam, a set of pivotally interconnected links one of which is pivotally attached to the front end of said second beam and the other of which is pivotally cooperable with said frame, and a roller carried by the front end of said second beam and interchangeably cooperable with a run-way on said frame.

3. In combination, a frame, a body, a main beam having its rear end pivotally attached to the rear portion of said frame and having its front end swingably associated with said body, a second beam having its rear end pivotally attached to said body and having its medial portion pivotally attached to a medial portion of said main beam, a set of pivotally interconnected links one of which is pivotally attached to the front end of said second beam and the other of which is pivotally cooperable with said frame, a roller carried by the front end of said second beam and interchangeably cooperable with a run-way on said frame, and a roller carried by the front end of said main beam and cooperable with the bottom of said body.

4. In combination, a frame structure, a body, a main beam having its opposite ends swingably associated with said structure and with said body, a second beam having one end pivotally associated with said body and having another portion thereof swingably associated with a medial portion of said main beam, a roller carried by the opposite end of said second beam and cooperable with a run-way on said frame, and a removable plate for confining said roller within said runway and for interchangeably permitting movement of said roller away from said run-way.

5. In combination, frame structure, a body, a main beam having its opposite ends swingably associated with said structure and with said body, a second beam having one end pivotally associated with said body and having another portion thereof swingably associated with a medial portion of said main beam, a roller carried by the opposite end of said second beam and cooperable with a run-way on said frame, a removable plate for confining said roller within said run-way and for interchangeably permitting movement of said roller away from said run-way, and a toggle for limiting the movement of said roller away from said run-way.

6. In combination, frame structure, a body, a main beam having its ends swingably associated with said structure and with said body, a second beam having one end pivotally associated with said body and having a medial portion thereof swingably associated with the medial portion of said main beam, the opposite end of said second beam being slidably cooperable with a run-way on said frame, removable means for confining said opposite beam end within said run-way and for interchangeably permitting movement of said end away from said run-way, and a toggle for limiting the movement of said opposite beam end away from said run-way.

7. In combination, frame structure, a body, a main beam having its opposite ends swingably associated with said structure and with said body, a second beam having one end pivotally associated with said body and having another portion thereof swingably associated with a medial portion of said main beam, a roller carried by the opposite end of said second beam and cooperable with a run-way on said frame, a removable plate for confining said roller within said run-way and for interchangeably permitting movement of said roller away from said run-way, and a set of pivotally interconnected links for limiting the movement of said roller away from said runway, one of said links having a pin cooperable with a slot in the other to provide a lost motion connection.

8. In combination, frame structure, a body, a main beam having its ends swingably associated with said structure and with said body, a second beam having one end pivotally associated with said body and having a medial portion thereof swingably associated with the medial portion of said main beam, the opposite end of said second beam being slidably cooperable with a run-way on said frame, removable means for confining said opposite beam end within said run-way and for interchangeably permitting movement of said end away from said run-way, and a set of pivotally interconnected links for limiting the movement of said opposite beam end away from said run-way, one of said links having a pin cooperable with a slot in the other to provide a lost motion connection.

In testimony whereof, I affix my signature.
CHARLES G. EISENBERG, Jr.